Feb. 18, 1964  K. A. KLINGLER  3,121,571
REINFORCED SEAL FOR RAILROAD CAR AXLE JOURNAL BOX
Filed Aug. 16, 1960  4 Sheets-Sheet 1
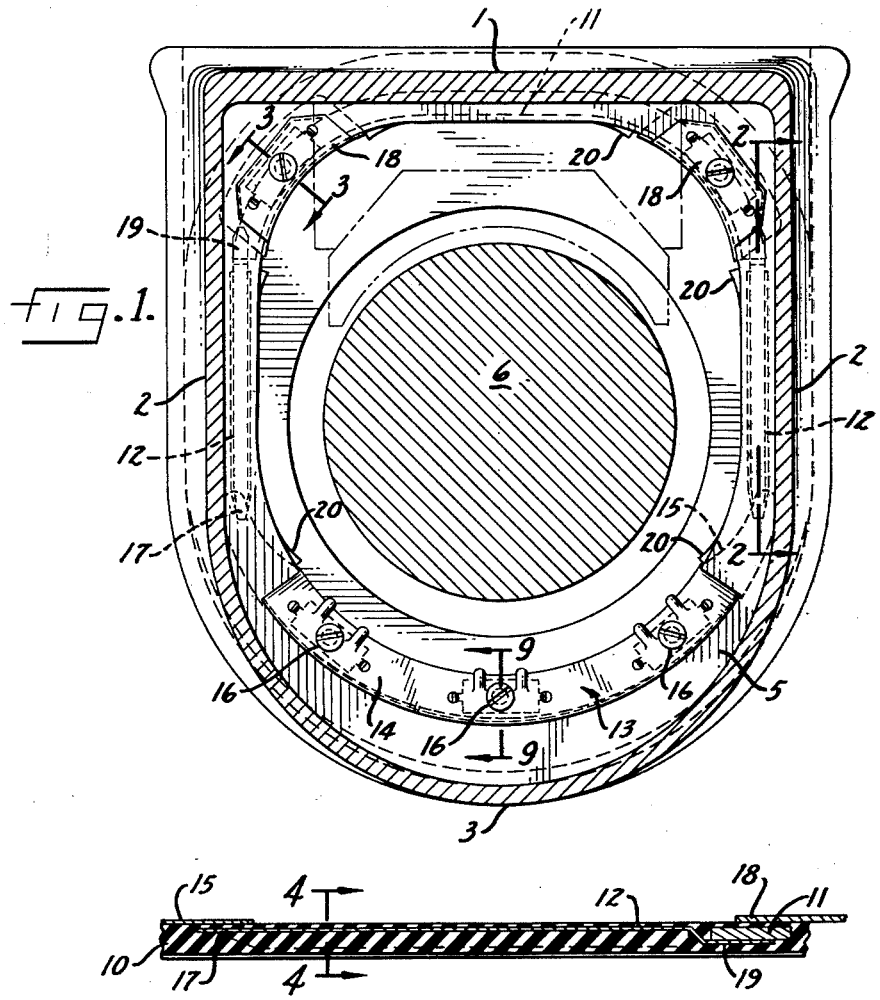
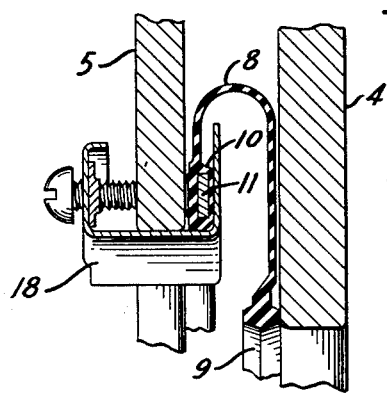
INVENTOR.
Karl A. Klingler,
BY Parker & Carter
Attorneys.

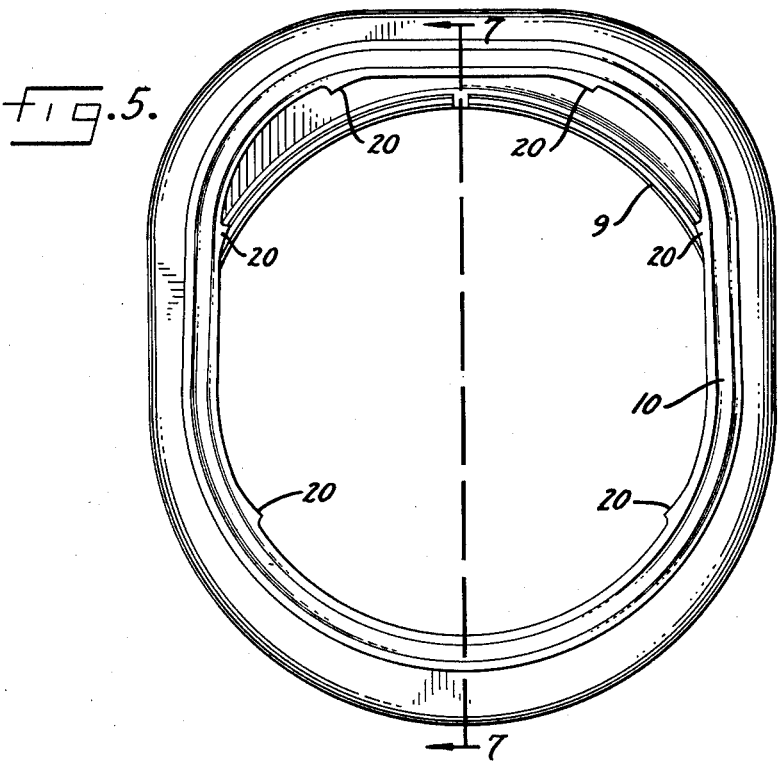
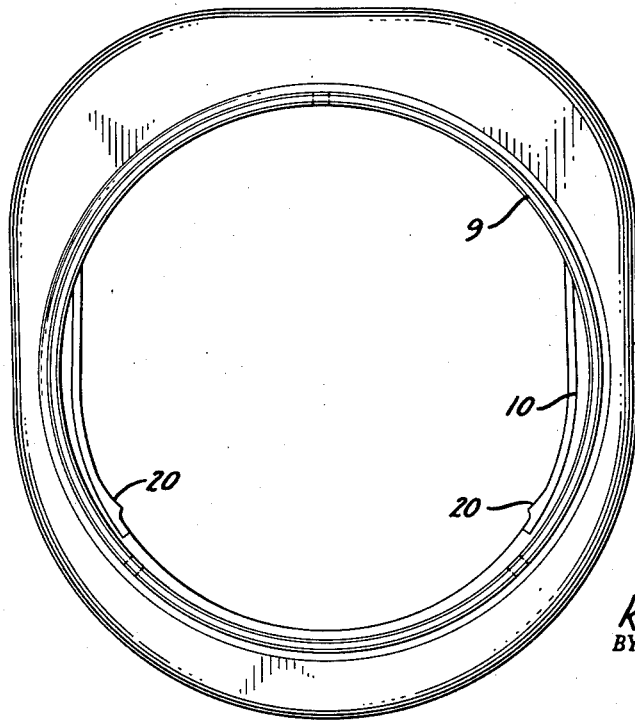

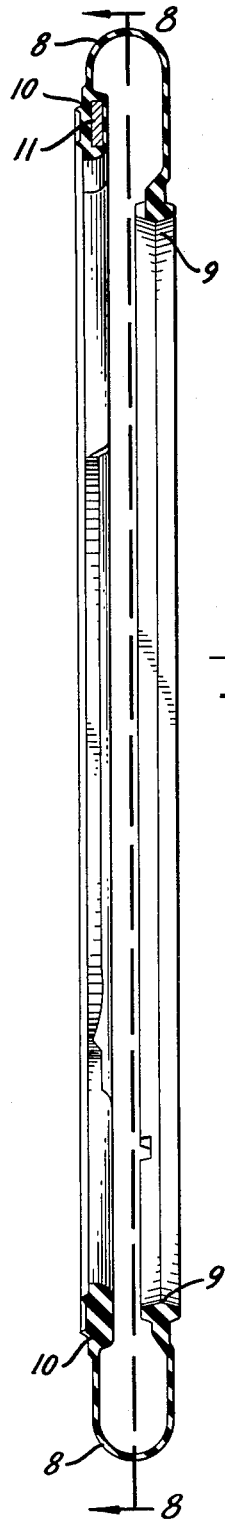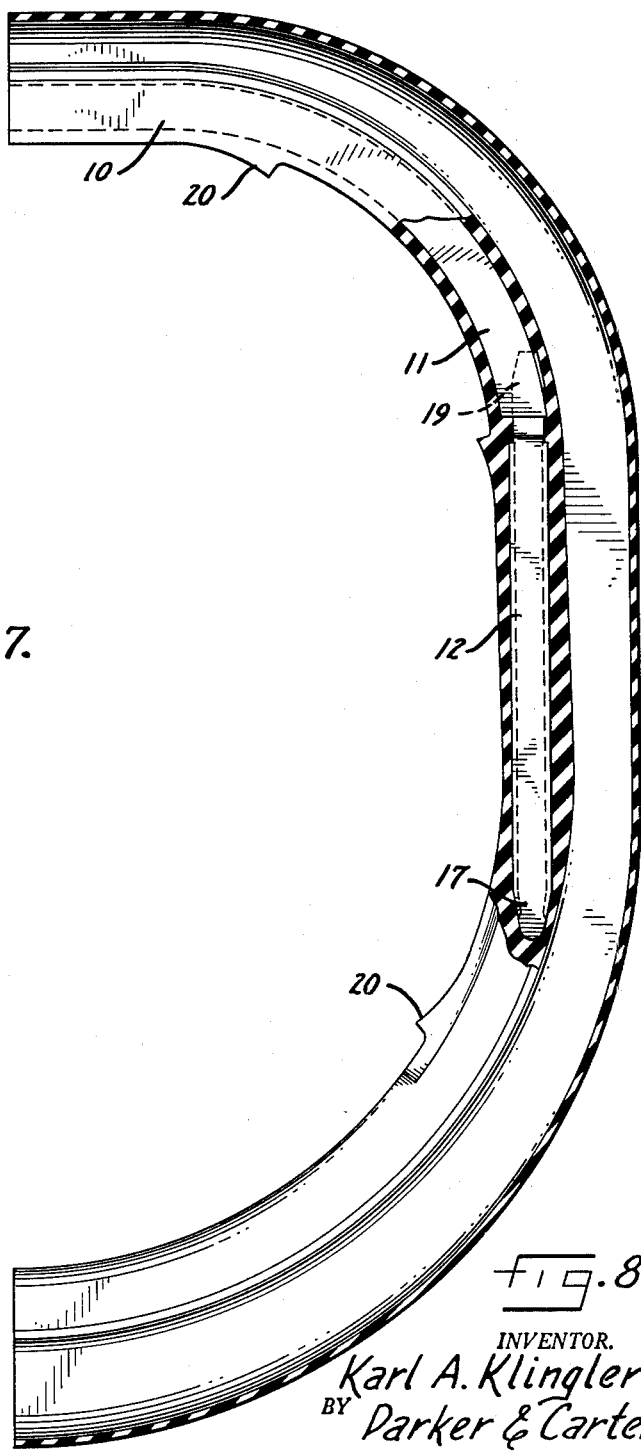

Feb. 18, 1964 K. A. KLINGLER 3,121,571
REINFORCED SEAL FOR RAILROAD CAR AXLE JOURNAL BOX
Filed Aug. 16, 1960 4 Sheets-Sheet 4
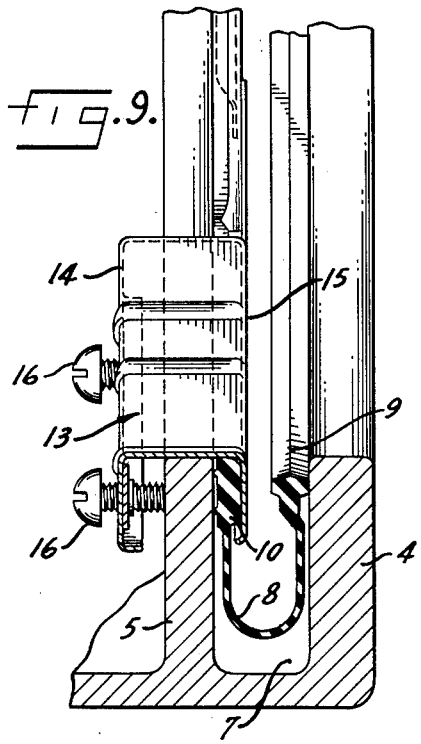
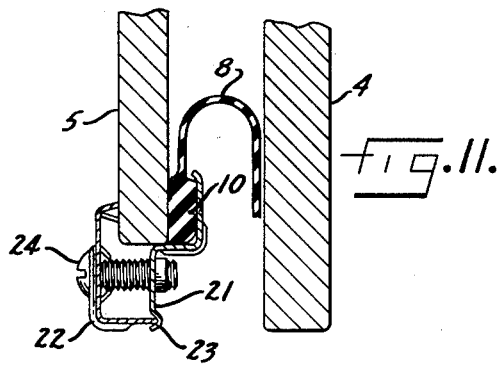
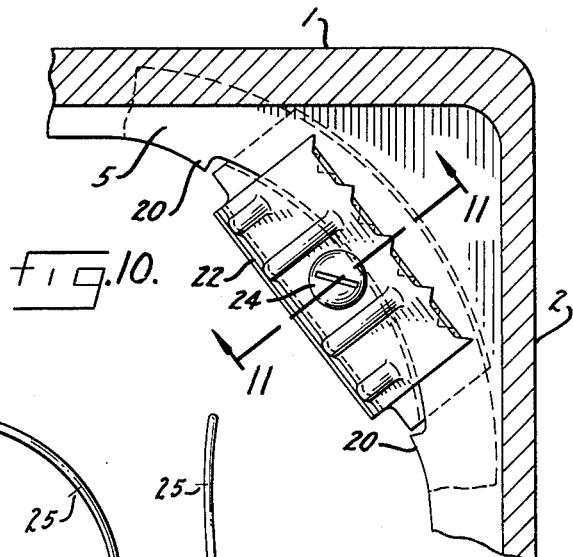
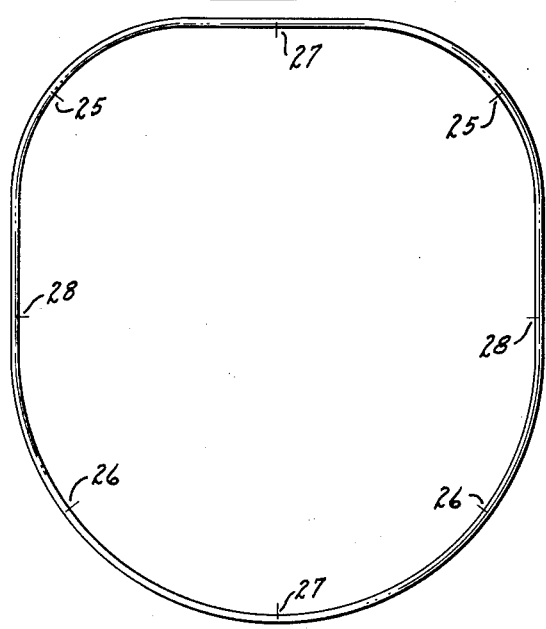
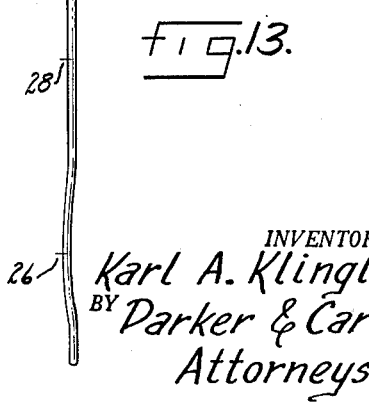
INVENTOR.
*Karl A. Klingler,*
BY *Parker & Carter*
*Attorneys.*

United States Patent Office 3,121,571
Patented Feb. 18, 1964

3,121,571
REINFORCED SEAL FOR RAILROAD CAR AXLE JOURNAL BOX
Karl A. Klingler, 111 S. Wright, Naperville, Ill.
Filed Aug. 16, 1960, Ser. No. 49,960
5 Claims. (Cl. 277—189)

My invention relates to improvements in oil seal assembly for railroad car axle journals and the like and has for one object to provide a reinforced seal for the inboard end of a railroad car axle journal box which will maintain a close oil-tight seal between the seal and the interior of the journal box independent of relative displacement of journal and box, and independent of inaccuracies in the journal and in the box.

Another object is to provide a seal which may be applied to the journal and put in place in the box without any change or adjustment of either, and wherein unskilled help may easily and rapidly apply the seal with the simple hand tools with which he is usually equipped.

One of the reasons why the usual type of railroad car axle journal box lubrication has continued to be used with oil soaked waste is that the substitution of liquid oiling methods has heretofore required expensive changes in the box and seal to prevent excessive oil leakage. I propose a seal which will itself maintain proper working relationship with the journal, can be easily installed and held in place in the box, and will protect itself independent of even excessive misalignment or displacement of the journal in the box against pinching or other dangerous action which might break down the seal.

The seal between the journal box and the axle will normally contact that part of the railroad car axle adjacent but of greater diameter than and inboard from the journal itself.

This invention involves an improved means of anchoring or supporting a seal such as that disclosed in my co-pending application Serial No. 24,641, filed April 20, 1960, issued as Patent No. 3,087,734, on April 30, 1963, in oil tight relationship with a railroad car axle journal box and I have omitted, in order to avoid confusion the sealing features of such application, limiting this disclosure to the bellows which supports the seal and the means for anchoring it in the box.

This invention is illustrated diagrammatically in the accompanying drawings, wherein FIGURE 1 is a section through a railroad car axle journal box and journal showing the seal in elevation;

FIGURE 2 is a section along the line 2—2 of FIGURE 1 looking in the direction of the arrows;

FIGURE 3 is a section on an enlarged scale along the line 3—3 of FIGURE 1;

FIGURE 4 is a section along the line 4—4 of FIGURE 2;

FIGURE 5 is a side elevation of the seal from the opposite side of FIGURE 1;

FIGURE 6 is a detail side elevation with parts omitted of the opposite side of the seal from FIGURE 5;

FIGURE 7 is a section along the line 7—7 of FIGURE 5;

FIGURE 8 is a half section in part elevation of the seal along the line 8—8 of FIGURE 7;

FIGURE 9 is a section along the line 9—9 of FIGURE 1;

FIGURE 10 is a corner detail similar to the upper right hand corner of FIGURE 1 on an enlarged scale showing a modified form of clamp;

FIGURE 11 is a section along the line 11—11 of FIGURE 10;

FIGURE 12 is a plan view of a modified form of gasket reinforcement;

FIGURE 13 is a side view thereof.

Like parts are indicated by like characters throughout the specification and drawings.

The railroad car axle journal box of the conventional type has top wall 1, side walls 2, bottom wall 3. At the inboard end, it terminates in an end wall 4 and partition wall 5, the walls being centrally apertured to permit entrance of the axle or journal 6. The walls 4 and 5 define a dust pocket 7 in which is mounted my oil seal.

The oil seal includes an elastomeric sleeve 8 bent back on itself, centrally apertured at both ends, one end aperture being defined by a reinforcing ring 9 which supports that part of the seal which engages the journal or axle and since the details of that part of the seal are disclosed in my co-pending application, they are omitted in the interest of clarity.

The other end of the sleeve is thickened as at 10 in FIGURE 9 to define a reinforcing annular rib and it is the structure of this reinforcing element which forms the subject matter of the present invention.

The seal bellows conforms generally to the contour of the journal box as indicated in FIGURE 1. Buried within the thickened portion 10 of the sleeve at the top is a U-shaped metallic reinforcing member 11 which extends across the top of the box and down a short distance around each corner of the upper portion thereof. This flat reinforcing member 11 on each side overlies a channelled reinforcing member 12 buried within the rubber or elastomeric thickened rim 10 and it extends down on both sides below the axis of the journal.

The clamp 13 is U-shaped in cross section, FIGURE 9. The arms of the U, 14 and 15, are on opposite sides of the wall 5. The arm 14 carries the screws 16 which engage wall and apply pressure to hold the arm 15 snugly against the enlarged thickened rim 10 at the lower part of the diaphragm. The arm 15 extends further around or further upward than does the arm 14 and it overlies the lower end 17 of the reinforcing member 12. Thus when pressure is applied to squeeze the U member 13 toward the left in FIGURE 3, a pressure is applied not only to the thickened portion 10 but also to the member 12, thus applying a pressure to squeeze and grip the portion 10 containing reinforcing member 11 against the wall 5. At the two upper corners of the box, similar but somewhat shorter clamp members 18 grip the upper portion of the member 10 with the reinforcing element 11 in it to hold that snugly against the wall 55 and apply a pressure to the offset end 19 of the reinforcing member 12.

It is important that the clamps 18 and the clamp 13 be properly positioned and in order to insure proper positioning integral lugs 20 are cast in the rubber rib 10 to abut against the ends of the clamps and insure that they will not drift away from the critical upper corners and lower segment of the diaphragm.

In the modified form shown in FIGURES 10 and 11, instead of the one piece horseshoe shaped clamp 18, the clamp takes the form of an inner element 21 which engages the thickened rim 10 and an outer element 22 which rocks in a fulcrum 23 on the member 21 and is pressed against the opposite face of the wall 5 by the screw 24.

The important thing here is that the clamps, both the upper clamps in the upper corner of the box and the clamp in the lower portion of the box are so positioned that horizontal or generally horizontal axial displacement of the journal cannot contact them. Each clamp is in general either above or below the journal and thus in parts of the box where excessive journal displacement is least likely to interfere with the clamps. As long as the clamps are left intact, they will hold the thickened rim 10 in contact with the journal box wall 5 and so maintain a close oil tight seal with the outer periphery of the diaphragm. The reinforcing members 12 bridge the gap between the upper clamps 18 and the lower clamp 13 and furnish a structural member to maintain close contact at those points. The clamp 13 extends around from the lower ends of the reinforcing members 12 and the reinforcing element 11 extends around from the upper ends of the clamps 18. Thus without the necessity of having clamps spaced in areas where displacement can occur and destruction of the clamp result, the thickened rim of the diaphragm is held throughout its entire periphery in snug contact with the wall 5.

In general, the arrangement of the clamps applies pressure in a sense at four corners of the box though the bottom of the box is curved. The four important clamps are the two at the upper top corner and the clamping means below them on both sides of the box. They apply pressure to the reinforcing elements in the thickened ring 10 to hold it snugly against the journal box wall 5.

In the modified form shown in FIGURE 12, I have illustrated as a substitute for the members 12 and the inter-relationship between those members and the flat reinforcing member 11, a single warped spring ring which may be warped before or after it is installed in the mold. It has high points on both sides and top and bottom so that when clamps are applied to the four corners, those high points exert pressure on the ring to hold it snugly against and make a static seal with the partition wall 5. Thus we have direct pressure applied in four points with a free loading spring pressure at four points so that at eight areas around the periphery you have a uniform pressure.

As a substitute for the rather complicated structure disclosed especially in FIGURES 1, 2 and 3, I may bury in the thickened portion 10 of the sleeve a reinforcing prestressed metal ring illustrated in plan view in FIGURE 12 and in side elevation in FIGURE 13. This ring will be molded into the reinforced thickened portion 10. It conforms in general contour to the shape of the gasket at the point where the thickened portion 10 occurs. It will be noted that the ring viewed in edge view is somewhat distorted. In the areas 25 at the top and 26 at the bottom, the ring is warped out of line so that when the ring is cast in the rubber thickened portion 10, it will be entirely contained therein but when the clamps 16 at the bottom and 18 at the top are applied, they tend to press down on areas 25 and 26 and exert a uniform heavy pressure throughout the entire periphery of the ring 10 against the wall 5. The important thing here is that there must be a solid static seal throughout the entire area and that there are no clamping means in the vertical areas 28 between the areas 25 and 26 because if there are any clamping means there and if the journal gets excessive lateral movement, the clamping means will be destroyed and oil leakage will result with resultant hot boxes. The ring is continuous. Lateral deformation or lateral displacement as a result of lateral displacement of the journal will not materially affect the downward pressure applied in the areas 27 and 28 by virtue of the fact that the clamps are applied at the areas 25 and 26.

I claim:

1. In combination, a seal for railroad car axle journal boxes including a member having a central aperture, an integral thickened rib encircling the member and encompassing said aperture, a plurality of segmental stiff reinforcing members each extending a part way around the aperture overlapping at their ends only, buried in and held in position by the rib, the assembly of segmental members defining an annular reinforcement for the thickened ribs, clamps overlying and interlocking with the rib adjacent the overlapping ends of the reinforcing members.

2. In combination, a seal for railroad car axle journal boxes including a member having a central aperture, an integral thickened rib encircling the member and encompassing said aperture, a plurality of stiff, reinforcing members overlapping at their ends only, buried in and held in position by the rib, one of the reinforcing members being U-shaped, another of the reinforcing members extending along a line tangential to the U-shaped reinforcing member at its end where they overlap, a clamp overlying and interlocking with the rib adjacent the end of the U-shaped reinforcing member.

3. A seal for railroad car axle journal boxes including a flexible, elastomeric sheet, a central aperture therethrough, a rib integral with the sheet encompassing the aperture, a pair of stiff, straight vertically disposed parallel reinforcing members on opposite sides of the aperture, buried in the rib, a U-shaped reinforcing member buried within the rib overlapping at each end a free end of one of the vertically disposed members, a U-shaped clamp overlying the rib adjacent the area of overlap of the straight and the U-shaped members.

4. A seal for railroad car axle journal boxes including a flexible, elastomeric sheet, a central aperture therethrough, a rib integral with the sheet encompassing the aperture, a pair of stiff, straight vertically disposed parallel reinforcing members on opposite sides of the aperture, buried in the rib, a U-shaped reinforcing member buried within the lower portion of the rib, overlapping at each end a free end of one of the vertically disposed members, a U-shaped clamp overlying the rib adjacent the area of overlap of the straight and the U-shaped members.

5. A seal for railroad car axle journal boxes including a flexible, elastomeric sheet, a central aperture therethrough, a rib integral with the sheet encompassing the aperture, a pair of stiff, straight vertically disposed parallel reinforcing members on opposite sides of the aperture, buried in the rib, a U-shaped reinforcing member buried within the lower portion of the rib, overlapping at each end a free end of one of the vertically disposed members, a U-shaped clamp overlying the rib adjacent the area of overlap of the straight and the U-shaped members, a U-shaped reinforcing member buried in the upper portion of the rib, overlapping at each end a free upper end of one of the vertically disposed members.

References Cited in the file of this patent

UNITED STATES PATENTS

| | | |
|---|---|---|
| 1,889,407 | Grisbaum et al. | Nov. 29, 1932 |
| 2,257,119 | Johannesen | Sept. 30, 1941 |
| 2,573,225 | Seamark | Oct. 30, 1951 |
| 2,719,743 | Brummer et al. | Oct. 4, 1955 |
| 2,826,441 | Niessen | Mar. 11, 1958 |
| 2,940,780 | Klingler | June 14, 1960 |
| 2,968,498 | Saunders | Jan. 17, 1961 |
| 2,995,389 | Johnson | Aug. 8, 1961 |
| 3,021,148 | Dickinson | Feb. 13, 1962 |

FOREIGN PATENTS

| | | |
|---|---|---|
| 1,221,228 | France | Jan. 11, 1960 |